US012800152B2

(12) United States Patent
Puchinger et al.

(10) Patent No.: US 12,800,152 B2
(45) Date of Patent: Nov. 17, 2026

(54) COOKING APPLIANCE

(71) Applicant: ELECTROLUX APPLIANCES AKTIEBOLAG, Stockholm (SE)

(72) Inventors: Bianca Puchinger, Rothenburg ob der Tauber (DE); Jennifer Kling, Rothenburg ob der Tauber (DE); Christian Mohr, Nuremberg (DE)

(73) Assignee: ELECTROLUX APPLIANCES AKTIEBOLAG, Stockholm (SE)

(*) Notice: Subject to any disclaimer, the term of this patent is extended or adjusted under 35 U.S.C. 154(b) by 1193 days.

(21) Appl. No.: 17/608,236

(22) PCT Filed: May 6, 2020

(86) PCT No.: PCT/EP2020/062583

§ 371 (c)(1),
(2) Date: Nov. 2, 2021

(87) PCT Pub. No.: WO2020/225303

PCT Pub. Date: Nov. 12, 2020

(65) Prior Publication Data

US 2022/0252273 A1 Aug. 11, 2022

(30) Foreign Application Priority Data

May 6, 2019 (EP) .................................... 19172685

(51) Int. Cl.
*F24C 7/08* (2006.01)
*G06F 3/01* (2006.01)
(Continued)

(52) U.S. Cl.
CPC ................ *F24C 7/08* (2013.01); *G06F 3/016* (2013.01); *H04N 9/31* (2013.01); *H05B 3/0076* (2013.01)

(58) Field of Classification Search
CPC . F24C 7/08; F24C 7/046; F24C 7/085; H05B 3/0076; H05B 6/645; G06F 3/16; H04N 9/31; G09B 19/00
(Continued)

(56) References Cited

U.S. PATENT DOCUMENTS 10,101,035 B1 * 10/2018 Thrun ...................... F24C 7/087
11,501,771 B2 * 11/2022 Shin ..................... G10L 21/0208
(Continued)

FOREIGN PATENT DOCUMENTS

DE 10208468 9/2003
DE 102015210879 12/2016

OTHER PUBLICATIONS

International Search Report and Written Opinion for PCT/EP2020/062583, dated Jul. 13, 2020, 8 pages.

*Primary Examiner* — Topaz L. Elliott
*Assistant Examiner* — Daniel Ward Hatten
(74) *Attorney, Agent, or Firm* — Chrisman Gallo Tochtrop LLC

(57) ABSTRACT

The invention relates to a cooking appliance (1) and a method for the preparation of a food product. The cooking appliance (1) comprises at least one or more cooking zones (2), a control unit (3), a storage unit (5) and a voice communication device (4). The control unit (3) and/or the voice communication device (4) is/are configured to identify the user based on a voice of the user as received by the voice communication device (4). The control unit (3) is configured to associate a respective user profile and the respective cooking settings and/or the respective cooking parameters and/or the respective cooking recipes and/or the respective cooking programs as stored in the storage unit (5) to the user and to control the one or more cooking zones (2) as a function of the user profile and the respective cooking settings and/or the respective cooking parameters and/or the
(Continued)

respective cooking recipes and/or the respective cooking programs.

21 Claims, 1 Drawing Sheet

(51) Int. Cl.
*H04N 9/31* (2006.01)
*H05B 3/00* (2006.01)

(58) Field of Classification Search
USPC .................................................. 219/506, 490
See application file for complete search history.

(56) References Cited

U.S. PATENT DOCUMENTS

| | | | | |
|---|---|---|---|---|
| 11,672,050 | B2 * | 6/2023 | Cheng | H05B 3/0076 219/411 |
| 2009/0258331 | A1 * | 10/2009 | Do | G09B 21/003 434/127 |
| 2013/0112683 | A1 * | 5/2013 | Hegedis | H05B 6/062 219/660 |
| 2016/0051078 | A1 * | 2/2016 | Jenkins | F24C 7/08 99/341 |
| 2018/0176030 | A1 * | 6/2018 | Bui Tran | G09B 5/067 |
| 2019/0053332 | A1 * | 2/2019 | Cheng | F24C 7/046 |
| 2019/0228856 | A1 * | 7/2019 | Leifer | G06F 16/9035 |

* cited by examiner

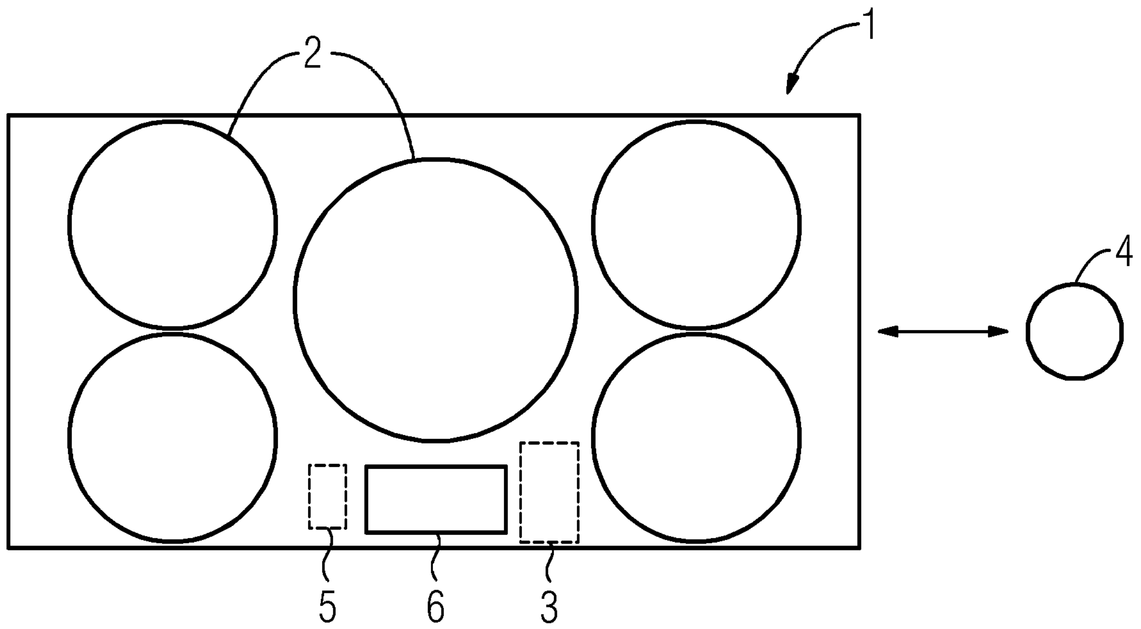
1
2
4
5
6
3

COOKING APPLIANCE

The present invention relates to a cooking appliance for the preparation of food products. More specifically, the present invention relates to a cooking appliance having at least a voice communication device, a storage unit for storing user profiles and a control unit.

Advantageously, the present invention also relates to a method of preparing food products by means of a cooking appliance.

BACKGROUND OF THE INVENTION

Cooking appliances, in particular domestic cooking appliances, are known for the preparation of food products by means of thermal conditioning of the food products being placed within a respective cookware. One type of a typical cooking appliance comprises one or more cooking zones, with each cooking zone being configured to host and/or carry cookware holding the food product.

It is furthermore known that a typical cooking appliance is provided with a user control interface allowing for a user to selectively set a power and/or energy input into the cooking zones. Often it is also necessary for the user to monitor the process of the thermal treatment of the food product and to possibly selectively modify the power and/or energy input into the cooking zones.

It is, however, considered that such cooking appliances come along with a limited user friendliness and limited user convenience.

Thus, a need is felt in the sector to improve the known cooking appliances, in particular in order to improve their user friendliness and/or the user convenience.

SUMMARY OF THE INVENTION

One aim of the present invention is to provide for a cooking appliance, to overcome, in a straightforward manner, at least one of the aforementioned drawbacks. In particular, one aim of the present invention is to provide for a cooking appliance coming along with an improved user friendliness and/or user convenience.

Another aim of the present invention is to provide for a method for thermally treating food products to overcome, in a straightforward manner, at least one of the aforementioned drawbacks. In particular, an aim of the present invention is to provide for a method of thermally treating food products coming along with an improved user friendliness and/or user convenience.

In addition, according to the present invention, there is provided a cooking appliance for the preparation of a food product comprising at least:

- one or more cooking zones for preparing, in particular thermally treating, even more particular heating and/or cooking, the food product;
- a control unit for controlling (the cooking appliance as a whole and) the one or more cooking zones;
- a storage unit configured to store one or more (distinct) user profiles and cooking settings and/or cooking parameters and/or cooking recipes and/or cooking programs associated to each user profile; and
- a voice communication device operatively coupled with the control unit and configured to provide a communication interface to a user of the cooking appliance, in particular between the user and the cooking appliance itself.

Advantageously, the control unit and/or the voice communication device is/are configured to identify and/or recognize the user based on a voice, in particular voice characteristics of the user, as received and/or acquired by the voice communication device. The control unit is furthermore configured to associate a respective user profile, as stored in the storage unit, to the voice and/or the user. Furthermore, the control unit is configured to also associate the respective cooking settings and/or the respective cooking parameters and/or the respective cooking recipes and/or the respective cooking programs as stored in the storage unit to the user, in particular as identified based on the user's voice and to control the one or more cooking zones as a function of the user profile and the respective cooking settings and/or the respective cooking parameters and/or the respective cooking recipes and/or the respective cooking programs.

It should be noted that in the context of the present description, the food product to be prepared is a single food product or a mixture, emulsion, suspension, water, oil or any other combination of food products. It should also be noted that the food product may also be defined by a mixture of liquids such as water, milk or oil and any other alimentary product needed for the preparation of the food product. It should also be noted that the food product to be prepared may vary throughout the overall cooking process; i.e. it may be possible to add further ingredients to or to remove one or more ingredients from the food product during the preparation process. E.g. during a first step of the preparation process, the food product is formed by a first component (e.g. water or oil) and only after the first component having reached a required condition, a second component (e.g. pasta or meat) is added. However, for the sake of simplicity, in the following, these possible variations in the exact composition of the food product are not further distinguished and simply the term "food product" is used, also including such possibilities.

It should be noted that the cooking appliance can be of any type being suited for the preparation of food products. The cooking appliance can comprise a cooking hob, in particular of the induction type, a stove, an oven (baking oven, steam oven, etc.), a microwave oven or combinations of the same.

It should be further noted that each cooking zone is configured to host and/or carry and/or support a cookware containing the food product and comprises means for heating the food product.

According to one example, the cooking zone can e.g. be defined by the one of a cooking hob, which is configured to carry the cookware and which is provided with means for transferring the thermal energy to the cookware and/or the food product. An example is a cooking zone comprising an induction coil, which is configured to generate an electromagnetic field for heating the cookware. An alternative example is a cooking zone being defined by a cavity of an oven or a microwave oven.

In particular, the cookware can be of any type, form and material (e.g. steel, cast iron, aluminum, clay, ceramics, etc.) as long that it is suitable to (temporarily) hold the food product during its preparation such as pans, pots, kettles, baking dishes, etc.

It should also be considered that the voice communication device may refer to a device adapted to communicate with a user orally, i.e. which is adapted to provide acoustic information, preferably words or sentences, to the user and receive spoken information form the user, in particular in order to initiate actions based on the received spoken information. Preferentially, the voice communication device may comprise user recognition capabilities (alone or in combination with the control unit).

It should be further noted that the storage unit can be of any type as long as it is suited to store one or more user profiles and the respective information regarding cooking settings and/or cooking parameters and/or cooking recipes and/or cooking programs.

It should be noted that according to some possible embodiments, the user profiles are specific user profiles, i.e. the control unit is configured to identify the user profile and to distinguish between a plurality of user profiles or in other words the specific users. Preferentially, each user profile may also contain additional information about the specific user such as a name, a nickname, the user's sex, the user's age and/or birthday, the user's specific dietary preferences (e.g. following a vegan diet, a vegetarian diet, eating fish but no meat, eating meat but no red meat, and so on) and/or information about a user's health status (e.g. having intolerances or allergies towards specific ingredients, having diabetes and similar).

It should also be noted that the term cooking settings indicate information on how the cooking appliance is to be operated in dependence of a specific user profile. Cooking settings may include information about a specific cooking zone or specific cooking zones to be used, specific cooking times to be followed, specific cooking temperatures to be maintained, possibly following a specific time-dependent profile, a (time-dependent profile) of a power and/or energy to be fed to the cooking zone(s) and/or a cooking level of the food product (e.g. rare, medium-rare, medium, medium-well, well done; al dente; etc.).

It should also be noted that the term cooking parameter describes (physical) parameters to be maintained, in particular time-dependent parameters, such as cooking temperatures, powers and/or energy to be fed to the cooking zone(s) and the like.

It should be also noted that the term cooking recipes describes the fact that the storage unit is configured to store information about the ingredients and possibly the procedures to be followed in order to prepare the food product.

Furthermore, it should be noted that the term cooking program indicates that the storage unit is configured to store information such that the cooking appliance is able to prepare the food product or in other words to execute the cooking process with as less intervention of the user as possible. A cooking program can contain information about the time-dependent parameters to be used, the ingredients to be added during the executing of a cooking program, etc.

As the control unit is configured to control the one or more cooking zones as a function of the user profile and the respective cooking settings and/or the respective cooking parameters and/or the respective cooking recipes and/or the respective cooking programs it is possible to assist the user in the preparation of the food product, in particular as the cooking process can be at least in parts executed without the intervention of the user thereby still considering the user's habits and/or preferences.

According to some preferred non-limiting embodiments, the cooking appliance further comprises a power unit operatively coupled to the control unit and to the one or more cooking zones and configured to selectively power and/or energize the one or more cooking zones. In particular, the control unit is configured to control the power unit as a function of the user profile and the respective cooking settings and/or the respective cooking parameters and/or the respective cooking recipes and/or the respective cooking programs for controlling the one or more cooking zones.

In particular, the power unit is configured to direct the required energy and/or power to the one or more cooking zones in dependence of the user profile and the respective cooking settings and/or the respective cooking parameters and/or the respective cooking recipes and/or the respective cooking programs.

It should be noted that the energy provided by the power unit can e.g. be in the form electrical energy or in the form of a gas to be burned.

By providing for the power unit being controlled by the control unit one obtains a controlling of the one or more cooking zones. As the control is achieved in dependence of the user profile and the respective cooking settings and/or the respective cooking parameters and/or the respective cooking recipes and/or the respective cooking programs for controlling the one or more cooking zones it is possible to improve the cooking experience and to render the use of the cooking appliance more user friendly.

According to some preferred non-limiting embodiments, the control unit is configured to control the power unit such that the power unit selectively powers, in use, the one or more cooking zones, in particular as a function of the user profile and the respective cooking settings and/or the respective cooking parameters and/or the respective cooking recipes and/or the respective cooking programs.

In this manner, it is guaranteed that also different food products can be prepared simultaneously, e.g. in order to prepare a more complex meal. An example is the preparation of pasta, which becomes prepared in a pot of boiling water and the preparation of the sauce, which is to be served with the pasta. By the power unit selectively powering the cooking zones, it is possible to trigger the preparation of e.g. the two food products such that they are ready at the same time.

According to some preferred non-limiting embodiments, the control unit is configured to modify and/or delete the cooking settings and/or cooking parameters and/or the cooking recipes and/or the cooking programs associated to the specific user profiles and/or to add new cooking settings and/or new cooking parameters and/or new cooking recipes and/or new cooking programs to the specific user profiles.

In this manner, the control unit allows to update the information associated to a specific user profile.

According to some preferred non-limiting embodiments, the control unit is configured to update the respective cooking settings and/or the respective cooking parameters and/or the respective cooking recipes and/or the respective cooking programs stored in the storage unit based on information gathered during an execution of a cooking process and/or a cooking program.

This is advantageous, as the information stored in the storage unit is not static, but may be varied throughout the lifetime of the cooking appliance, also considering changes of the habits and preferences of a user.

According to some preferred non-limiting embodiments, the cooking appliance is configured to allow the user to adjust cooking parameters, such as e.g. the cooking temperature and/or the cooking power and/or the power and/or energy of the one or more cooking zones by means of a distinct control interface of the cooking appliance and/or the voice communication device. Advantageously, the control unit is configured to modify the respective cooking settings and/or the respective cooking parameters and/or the respective cooking recipes associated to the user profile in dependence of adjustments of the cooking parameters of the one or more cooking zones as executed by the user during use of the cooking appliance. An example is seen in that the user may modify a power and/or energy input to the cooking zones, e.g. as the user recognizes that the power and/or energy input is too much or too less.

In this way, it is possible for the control unit to consider N possible interventions of the user during the execution of a cooking process and/or a cooking program. E.g. the user could command a modification of the cooking time and/or of the cooking power and/or the cooking temperature and/or the addition or submission of an ingredient.

According to some preferred non-limiting embodiments, the control unit is furthermore configured to communicate with the user via said voice communication device during use of the cooking appliance and to actively ask for an user input and/or a user action, preferably via said voice communication device.

In particular, in this manner it is possible to interact with the user during the preparation of a food product. This may allow the control unit to ask for a user input such as e.g. whether the user prefers a certain kind of degree of cooking or whether the user intends to use a specific ingredient and so on. It may also be possible to ask the user to perform certain tasks, which cannot be executed by the cooking appliance alone. Such a task may e.g. be the addition or removal of an additional ingredient or the removal of the cookware and so on.

Preferentially, the control unit is also configured to adapt the respective cooking settings and/or cooking parameters and/or the respective cooking recipes and/or the respective cooking program associated to the respective user profile as stored in said storage unit based on the user input.

In this way, it is possible for the control unit to consider a specific choice of the user and to modify existing cooking settings and/or cooking parameters and/or cooking recipes and/or cooking programs and/or to create and associate new cooking settings and/or cooking parameters and/or cooking recipes and/or cooking programs to the specific user profile.

Preferentially, the control unit is also configured to instruct the user via the voice communication device to add ingredients and/or to perform specific cooking tasks during the execution of a cooking program and/or a cooking process.

In this way, the control unit guarantees the correct preparation of the food product with respect to these actions, which cannot be executed by the cooking appliance without the intervention of the user.

Preferentially, the control unit is also configured to execute one or more question-answer schemes during a communication with the user via the voice communication device. In particular, each question-answer scheme allows for the control unit to receive information, which allow the control unit again to correctly execute a cooking process and/or a cooking program.

In this way, it is possible to obtain the correct preparation of the food product.

Preferentially, the control unit is also configured to interact with the user via the voice communication device in order to gather information from the user regarding a cooking recipe to be used, a degree of cooking, amount of food to be cooked and/or a number of persons participating in the meal. Even more preferentially, the control unit is also configured to control the one or more cooking zones in dependence of the gathered information. E.g. the amount of food to be cooked can influence also the needed energy and/or power, which needs to be fed to the respective cooking zones.

This allows to optimize the control of the cooking zones by means of the control unit.

According to some preferred non-limiting embodiments, the control unit is also configured to select and/or suggest and/or prohibit certain cooking functions of the cooking appliance based on the selected user profile.

In this manner, it is possible to further improve the user experience and/or to reduce any risk associated to the use of the cooking appliance. E.g. when the control unit and/or the voice communication device has identified the user to be a child, it may prevent the use of certain cooking functions or of the cooking appliance as a whole.

According to some preferred non-limiting embodiments, the respective cooking settings and/or cooking parameters and/or cooking recipes and/or cooking programs associated to each user profile contain information regarding at least a type and/or format of cookware and/or recipe parameters and/or a type and/or a source and/or a quantity of ingredients used and/or cooking times and/or cooking temperatures and/or cooking powers and/or a degree of cooking and/or an amount of food to be cooked and/or a number of persons participating in a meal and/or a specific cooking zone. Accordingly, the control unit is configured to control the cooking zones according to such information.

In this manner, one achieves a further improvement of the cooking experience and user friendliness of the cooking appliance.

According to some preferred non-limiting embodiments, the control unit is configured to receive recipe specification information of a specific cooking recipe from the user via the voice communication device and to control the one or more cooking zones as a function of the recipe specification information. In particular, the recipe specification information may contain the quantity of the single ingredients used and/or the type and/or format of the ingredient (e.g. spaghetti instead of other types of pasta) and/or the state of the ingredient (e.g. frozen, fresh, etc.).

In this way, it is possible for the control unit to optimize the food preparation.

Preferably, the control unit is configured to adjust and/or provide and/or suggest specific cooking settings and/or cooking parameters of the one or more cooking zones in dependence of the recipe specification information. E.g. the control unit could indicate the user to place the cookware on a specific cooking zone and to control a power and/or energy entry input into this specific cooking zone. This allows to further improve the user experience.

Preferably, the control unit is configured to assign recipe-specific cooking settings and/or cooking parameters and/or cooking programs to said recipe information.

According to some preferred non-limiting embodiments, the control unit is configured to provide information to the user, in particular after receiving information from the user, via the voice communication device regarding at least a preferred cooking zone, cooking time, a type and/or source of ingredients and/or an amount of ingredients in dependence of the user profile and the respective cooking settings and/or the respective cooking parameters and/or the respective cooking recipes and/or the respective cooking programs associated to the user profile.

In this manner, it is guaranteed to prepare the food product according to the user's habits and preferences.

According to some preferred non-limiting embodiments, the cooking appliance comprises a measurement unit operatively coupled to the control unit and configured to determine (real-time) cooking parameters and/or cookware-specific information of a cookware coupled to the one or more cooking zones before and/or during and/or after the execution of a cooking program, possibly also the respective time-profiles.

Preferentially, the control unit is configured to control the cooking zones in dependence of the cooking parameters and/or the cookware-specific information as determined, in use, by the measurement unit.

This allows the control unit to obtain real-time data for monitoring the cooking process(es) and/or cooking programs and to optimize the control of the cooking zones.

In particular, the cooking parameters may include (food) temperature and/or the power and/or energy entry to the cooking zones and/or weight of the food product and/or the cookware.

In particular, the cookware-specific information may include the type and/or format and/or the size of the cookware used and/or information on whether a lid is used or not and/or the material of the cookware.

Preferentially, the measurement unit comprises one or more sensors configured to determine one or more physical parameters of the food product and/or the cookware containing the food product to be cooked. Even more preferentially, the sensors are configured to determine the physical parameters selectively with respect to each cooking zone.

Preferentially, the physical parameters are chosen at least from the group of a cooking temperature (the temperature of the food product) and/or the power and/or energy entry to the cooking zones and/or a weight of the cookware and/or the food product to be cooked and/or a material of the cookware and/or a size and/or format and/or type of the cookware.

Preferentially, the measurement unit comprises at least a temperature sensor and/or a weight sensor. Even more preferentially, the measurement unit comprises more than one temperature sensor and/or weight sensor, each one associated to one respective cooking zone.

In particular, the temperature sensor can be configured to be introduced into the food product and/or being configured to indirectly determine the food temperature and/or configured to operate by means of heat radiation.

Preferentially, the measurement unit is configured to determine electrical values of the cooking appliance for establishing based on said measured electrical values cookware-specific information of the cookware coupled to the one or more cooking zones. The control unit is configured to command the storage unit to store the cookware-specific information in the storage unit and to associated the cookware-specific information to a specific user profile.

Preferentially, the control unit is configured to choose and/or control cooking settings based on the cooking parameters and/or the cookware-specific information determined by the measurement unit.

According to some preferred non-limiting embodiments, the control unit is configured to execute a set-up scheme the first time a user is recognized by the control unit and/or the voice communication device and to store a new user profile with respect to this new user. In particular, the set-up scheme requires the interaction with the new user via the voice communication device.

Preferentially, the control unit is configured to run a question-answer scheme when, in use, running the set-up scheme, in particular for receiving specific information from the user, such as e.g. the name and/or the nickname and/or the user's sex and/or the user's age and/or birthday and/or the user's specific dietary preferences and/or information about the user's health status.

In addition, according to a further aspect, the invention advantageously relates to a method for controlling a cooking process of a cooking appliance for the preparation, in particular thermally treating, even more particular heating and/or cooking, of a food product. The cooking appliance comprises at least:

- one or more cooking zones for preparing, in particular thermally treating, even more particular heating and/or cooking, the food product;
- a control unit for controlling (the cooking appliance and) the one or more cooking zones;
- a storage unit configured to store one or more (distinct) user profiles and cooking settings and/or cooking parameters and/or cooking recipes and/or cooking programs associated to each user profile; and
- a voice communication device operatively coupled with the control unit and configured to provide a communication interface to a user of the cooking appliance, in particular between the user and the cooking appliance itself.

Advantageously, the method comprises the steps of:

- receiving an user input via the voice communication device;
- identifying (and/or recognizing) the user based on the voice of the user resulting from the user input as received and/or acquired by the voice communication device;
- associating a user profile and the respective cooking settings and/or the respective cooking parameters and/or the respective cooking recipes and/or the respective cooking programs as stored in the storage unit to the voice; and
- controlling the one or more cooking zones as a function of the user profile and the respective cooking settings and/or the respective cooking parameters and/or the respective cooking recipes and/or the respective cooking programs.

As during the step of controlling, the one or more cooking zones are controlled as a function of the user profile and the respective cooking settings and/or the respective cooking parameters and/or the respective cooking recipes and/or the respective cooking programs it is possible to assist the user in the preparation of the food product, in particular as the cooking process can be at least in parts executed without the intervention of the user thereby still considering the user's habits and/or preferences.

Preferentially, during the step of identifying the control unit and/or the voice communication device identify and/or recognize the user based on the user's voice, in particular the voice characteristics of the user.

Preferentially, during the step of associating, the control unit associates the voice to the user profile.

Preferentially, during the step of controlling, the control unit controls the one or more cooking zones.

According to some preferred non-limiting embodiments, during the step of controlling, a power unit of the cooking appliance being operatively coupled to the control unit and to the one or more cooking zones selectively powers and/or energizes the one or more cooking zones. In particular, the control unit controls the power unit as a function of the user profile and the respective cooking settings and/or the respective cooking parameters and/or the respective cooking recipes and/or the respective cooking programs for controlling the one or more cooking zones.

In particular, the power unit directs the required energy and/or power to the one or more cooking zones in dependence of the user profile and the respective cooking settings and/or the respective cooking parameters and/or the respective cooking recipes and/or the respective cooking programs.

By providing for the power unit being controlled by the control unit one obtains a controlling of the one or more cooking zones. As the control is achieved in dependence of the user profile and the respective cooking settings and/or the respective cooking parameters and/or the respective cooking recipes and/or the respective cooking programs for controlling the one or more cooking zones it is possible to improve the cooking experience and to render the use of the cooking appliance more user friendly.

According to some preferred non-limiting embodiments, during the step of controlling, the control unit controls the power unit such that the power unit selectively powers and/or energizes the one or more cooking zones, in particular as a function of the user profile and the respective cooking settings and/or the respective cooking parameters and/or the respective cooking recipes and/or the respective cooking programs.

In this manner, it is guaranteed that also different food products can be prepared simultaneously, e.g. in order to prepare a more complex meal.

According to some preferred non-limiting embodiments, the method also comprises:

- a step of updating, during which the control unit modifies and/or deletes the cooking settings and/or cooking parameters and/or the cooking recipes and/or the cooking programs associated to the specific user profiles; and/or
- a step of adding, during which the control unit adds new cooking settings and/or new cooking parameters and/or new cooking recipes and/or new cooking programs to the specific user profiles.

In this manner, the control unit allows to update the information associated to a specific user profile and/or to add new information.

According to some preferred non-limiting embodiments, during the step of updating, the control unit updates the respective cooking settings and/or the respective cooking parameters and/or the respective cooking recipes and/or the respective cooking programs stored in the storage unit based on information gathered during an execution of a cooking process and/or a cooking program.

This is advantageous, as the information stored in the storage unit is not static, but may be varied throughout the lifetime of the cooking appliance and may adapted to changing habits and/or preferences of the user.

According to some preferred non-limiting embodiments, the method also comprises a step of adjusting, during which the user adjusts cooking parameters, such as e.g. the cooking temperature N and/or the cooking power and/or the power and/or energy of the one or more cooking zones by means of a distinct control interface of the cooking appliance and/or the voice communication device.

Advantageously, during the step of updating, the control unit modifies the respective cooking settings and/or the respective cooking parameters and/or the respective cooking recipes associated to the user profile in dependence of adjustments applied during the step of adjusting.

In this way, it is possible for the control unit to consider possible interventions of the user during the execution of a cooking process and/or a cooking program.

According to some preferred non-limiting embodiments, the method also comprises a step of inquiring, during which the control unit communicates with the user via the voice communication device and to actively inquires on an user input and/or an user action, preferably via the voice communication device.

In particular, in this manner it is possible to interact with the user during the preparation of a food product.

Preferentially, during the step of updating, the control unit adapts the respective cooking settings and/or cooking parameters and/or the respective cooking recipes and/or the respective cooking program associated to the respective user profile as stored in said storage unit based on the user input as obtained during the step of inquiring.

In this way, it is possible for the control unit to consider a specific choice of the user and to modify existing cooking settings and/or cooking parameters and/or cooking recipes and/or cooking programs and/or to create and associate new cooking settings and/or cooking parameters and/or cooking recipes and/or cooking programs to the specific user profile.

Preferentially, the method also comprises a step of instructing, during which the control unit instructs the user via the voice communication device to add ingredients and/or to perform specific cooking tasks during the execution of a cooking program.

In this way, the control unit guarantees the correct preparation of the food product with respect to these actions, which cannot be executed by the cooking appliance without the intervention of the user.

Preferentially, during the step of inquiring, the control unit also executes one or more question-answer schemes. In particular, each question-answer scheme allows for the control unit to receive information, which allow the control unit again to correctly execute the cooking process and/or the running cooking program.

In this way, it is possible to obtain the correct preparation of the food product.

Preferentially, during the step of inquiring, the control unit gathers information from the user regarding a cooking recipe to be used, a degree of cooking, amount of food to be cooked and/or a number of persons participating in the meal. Even more preferentially, during the step of controlling, the control unit is also configured to control the one or more cooking zones in dependence of the gathered information.

This allows to optimize the control of the cooking zones by means of the control unit.

According to some preferred non-limiting embodiments, during the step of controlling, the control unit may also select and/or suggest and/or prohibit certain cooking functions of the cooking appliance based on the selected user profile.

In this manner, it is possible to further improve the user experience and/or to reduce any risk associated to the use of the cooking appliance.

According to some preferred non-limiting embodiments, during the step of controlling, the control unit considers at least a type and/or format of cookware and/or recipe parameters and/or a type and/or a source and/or a quantity of ingredients used and/or cooking times and/or cooking temperatures and/or cooking powers and/or a degree of cooking and/or an amount of food to be cooked and/or a number of persons participating in a meal and/or a specific cooking zone for controlling the one or more cooking zones.

In this manner, one achieves a further improvement of the cooking experience and user friendliness of the cooking appliance.

According to some preferred non-limiting embodiments, during the step of controlling, the control unit controls the one or more cooking zones as a function of the recipe specification information received from the user via the voice communication device. In particular, the recipe specification information may contain the quantity of the single ingredients used and/or the type and/or format of the ingredient (e.g. spaghetti instead of other types of pasta) and/or the state of the ingredient (e.g. frozen, fresh, etc.).

In this way, it is possible for the control unit to optimize the food preparation.

Preferably, during the step of controlling, the control unit adjusts and/or provides and/or suggests specific cooking settings and/or cooking parameters of the one or more cooking zones in dependence of the recipe specification information. E.g. the control unit could indicate the user to place the cookware on a specific cooking zone and to control a power and/or energy entry into this specific cooking zone. This allows to further improve the user experience.

According to some preferred non-limiting embodiments, during the step of controlling, the control unit is configured to provide information to the user, in particular after receiving information from the user, via the voice communication device regarding at least a preferred cooking zone, cooking time, a type and/or source of ingredients and/or an amount of ingredients in dependence of the user profile and the respective cooking settings and/or the respective cooking parameters and/or the respective cooking recipes and/or the respective cooking programs associated to the user profile.

In this manner, it is guaranteed to prepare the food product according to the user's habits and preferences.

According to some preferred non-limiting embodiments, the method also comprises a step of measuring, during which a measurement unit of the cooking appliance, which is operatively coupled to the control unit, determines cooking parameters and/or cookware-specific information of a cookware coupled to the one or more cooking zones before and/or during and/or after the execution of a cooking program and/or a cooking process. In particular, respective time-dependent profiles are determined.

Preferentially, during the step of controlling, the control unit controls the cooking zones in dependence of the cooking parameters and/or the cookware-specific information as determined by the measurement unit.

This allows the control unit to obtain real-time data for monitoring the cooking process(es) and/or the cooking program and to optimize the control of the cooking zones by the control unit as the control unit can consider the real time data and/or the specific data about the cookware.

In particular, the cooking parameters may include temperature and/or the power and/or energy entry to the cooking zones and/or weight of the food product and/or the cookware.

In particular, the cookware-specific information may include the type and/or format and/or the size of the cookware used and/or information on whether a lid is used or not and/or the material of the cookware.

Preferentially, during the step of measuring, the measurement unit determines, in particular selectively determines with respect to the cooking zones, the one or more physical parameters of the food product and/or the cookware containing the food product to be cooked by means of one or more sensors of the measuring unit.

Preferentially, the physical parameters are chosen at least from the group of a cooking temperature (the temperature of the food product) and/or the power and/or energy entry to the cooking zones and/or a weight of the cookware and/or the food product to be cooked and/or a material of the cookware and/or a size of the cookware.

Preferentially, during the step of measuring, the measurement unit determines electrical values of the cooking appliance for establishing based on said measured electrical values cookware-specific information of the cookware coupled to the one or more cooking zones. During the step of controlling, the control unit commands the storage unit to store the cookware-specific information in the storage unit and to associate the cookware-specific information to a specific user profile.

Preferentially, during the step of controlling, the control unit chooses and/or controls the cooking settings based on the cooking parameters and/or the cookware-specific information determined by the measurement unit.

According to some preferred non-limiting embodiments, the method also comprises a set-up step, during which the control unit executes a set-up scheme the first time a user is recognized by the control unit and/or the voice communication device and to store a new user profile with respect to this new user. In particular, the execution of the set-up scheme requires the interaction with the new user via the voice communication device.

Preferentially, during the set-up step, the control unit runs a question-answer scheme, in particular for receiving specific information from the user, such as e.g. the name and/or the nickname and/or the user's sex and/or the user's age and/or birthday and/or the user's specific dietary preferences and/or information about the user's health status.

The term "essentially" or "approximately" as used in the invention means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawing, in which:

FIG. 1 shows an example schematic illustration of a cooking appliance.

DETAILED DESCRIPTION OF PREFERRED EMBODIMENTS

The present invention will now be described with reference to the accompanying drawing, in which one non-limiting embodiment of the present invention is shown. However, this invention should not be construed as limited to the embodiments set forth herein. Throughout the following description, similar reference numerals have been used to denote similar elements, parts, items or features, when applicable.

The FIGURE shows a schematic illustration of a cooking appliance 1, in the present case a cooking hob, specifically an induction cooking hob. However, a person skilled in the art may recognize that the present invention can be also included in other household appliances, e.g. baking ovens, steam ovens, microwave ovens etc.

The cooking appliance 1 comprises at least:

- a plurality of cooking zones 2 for preparing food, in particular each cooking zone 2 being provided with a support surface for carrying a cookware holding the food product and an induction coil for generating an electromagnetic field;
- a control unit 3 for controlling (cooking appliance 1 and) cooking zones 2;
- a voice communication device 4 operatively coupled to the control unit 3 and configured to provide a communication interface to a user of the cooking appliance 1; and a storage unit 5 configured to store one or more user profiles and cooking settings and/or cooking parameters and/or cooking recipes and/or cooking programs associated to each user profile.

Control unit 3 and/or voice communication device 4 is/are configured to identify and/or recognize a user based on characteristics of the voice of the user.

Control unit 3 is furthermore configured to associate a respective user profile and the respective cooking settings and/or the respective cooking parameters and/or the respective cooking recipes and/or the respective cooking programs as stored in storage unit 5 to the user and/or the voice. Furthermore, control unit 3 is configured to control the one or more cooking zones 2 as a function of the user profile and the respective cooking settings and/or the respective cooking parameters and/or the respective cooking recipes and/or the respective cooking programs.

In particular, voice communication device 4 and control unit 3 may be operationally connected by means of a wiring and/or by means of a wireless connection.

According to some possible embodiments, storage unit 5 and control unit 3 may be operationally connected by means of a wiring and/or by means of a wireless connection.

In particular, cooking appliance 1 comprises a main body carrying cooking zones 2, and in particular also control unit 3.

As shown in FIG. 1, voice communication device 4 may be an external device (i.e. separated from main body). However, according to other alternative embodiments, voice communication device 4 may form an integral part of cooking appliance 1 (i.e. may be carried by the main body).

Furthermore and with particular reference to FIG. 1, storage unit 5 may be carried by the main body. Alternatively or in addition, storage unit 5 may comprise an external device detached from the main body, and in particular configured to communicate by means of a wireless and/or a LAN connection with control unit 3. According to such an alternative embodiment, storage unit 5 may be defined by and/or may comprise an external server and/or a cloud service and/or a computer device and/or a mobile device such as a tablet, a mobile telephone or the like.

More in detail, control unit 3 may communicate with the user via the voice communication device 4 and may receive input and/or information from the user and/or may provide information and/or instructions to the user via the voice communication device 4.

Preferentially, cooking appliance 1 further comprises a power unit (not shown) operatively coupled to control unit 3 and to cooking zones 2 and configured to selectively power and/or energize cooking zones 2. Control unit 3 is configured to control the power unit as a function of the user profile and the respective cooking settings and/or the respective cooking parameters and/or the respective cooking recipes and/or the respective cooking programs for controlling cooking zones 2. Thus, the power unit is configured to direct (as being controlled by control unit 3) the required energy and/or power to cooking zones 2 in dependence of the user profile and the respective cooking settings and/or the respective cooking parameters and/or the respective cooking recipes and/or the respective cooking programs.

In the example shown in FIG. 1, the energy is provided in the form electrical energy, in particular for controlling the selectively controlling the formation of the electromagnetic field by means of the respective induction coils. Alternatively, the energy could be stored in the form of a gas to be burned.

In particular, control unit 3 is configured to control the power unit such that the power unit selectively powers, in use, cooking zones 2 as a function of the user profile and the respective cooking settings and/or the respective cooking parameters and/or the respective cooking recipes and/or the respective cooking programs.

Preferentially, cooking appliance 1 also comprises a measurement unit operatively coupled to control unit 3 and configured to determine cooking parameters and/or cookware-specific information of cookware coupled to cooking zones 2 before and/or during and/or after the execution of a cooking program so that, in use, control unit 3 controls cooking zones 2 in dependence of the cooking parameters (e.g. temperature, weight, the power and/or energy entry) and/or the cookware-specific information (e.g. type, the format, the material and/or the size of the cookware and/or information on whether a lid is used or not) as determined, in use, by the measurement unit. In particular, the measurement unit allows control unit 3 to obtain real-time data for monitoring the cooking process(es) and/or the cooking program and to control cooking zones 2 based on the real-time data.

Preferentially, the measurement unit comprises one or more sensors, in particular at least one temperature sensor and/or one weight sensor, configured to determine one or more physical parameters of the food product and/or the cookware containing the food product to be cooked. Even more preferentially, the sensors are configured to determine the physical parameters selectively with respect to each cooking zone.

Preferentially, the measurement unit is configured to determine electrical values of cooking appliance 1 for establishing based on said measured electrical values cookware-specific information of the cookware coupled to cooking zones 2. Control unit 3 is configured to command storage unit 5 to store the cookware-specific information in storage unit 5 and to associate the cookware-specific information to a specific user profile.

Preferentially, control unit 3 is configured to choose and/or control cooking settings based on the cooking parameters and/or the cookware-specific information determined by the measurement unit, in particular for controlling the cooking zones 2.

Additionally, control unit 3 is configured to modify and/or delete the cooking settings and/or cooking parameters and/or the cooking recipes and/or the cooking programs associated to the specific user profiles and/or to add new cooking settings and/or new cooking parameters and/or new cooking recipes and/or new cooking programs to the specific user profiles.

Preferentially, control unit 3 is configured to update the respective cooking settings and/or the respective cooking parameters and/or the respective cooking recipes and/or the respective cooking programs stored in the storage unit based on information gathered during an execution of a cooking process and/or a cooking program.

Advantageously, cooking appliance 1 comprises a user control interface 6, in particular connected to the main body, configured to allow a user to adjust cooking parameters, such as e.g. the cooking temperature and/or the cooking power and/or the power and/or energy to be selectively provided to cooking zones 2.

Alternatively or in additional also voice communication device 4 is configured to allow the user to adjust the cooking parameters.

Advantageously, control unit 3 is configured to modify the respective cooking settings and/or the respective cooking parameters and/or the respective cooking recipes associated to the user profile in dependence of adjustments of the cooking parameters of cooking zones 2. An example is seen in that the user may modify a power and/or energy input to cooking zones 2, e.g. by means of user control interface 6 and/or voice communication device 4.

In more detail, control unit 3 is configured to communicate with the user via voice communication device 4 and to actively ask for an user input and/or a user action, preferably via voice communication device 4.

Preferentially, control unit 3 is also configured to adapt the respective cooking settings and/or cooking parameters and/or the respective cooking recipes and/or the respective cooking program associated to the respective user profile as stored in storage unit 5 based on the user input.

Preferentially, control unit 3 is also configured to instruct the user via voice communication device 4 to add ingredients and/or to perform specific cooking tasks during the execution of a cooking program and/or a cooking process.

Preferentially, control unit 3 is also configured to execute one or more question-answer schemes during a communication with the user via voice communication device 4. In particular, each question-answer scheme allows for control unit 3 to receive information, which allow control unit 3 again to correctly execute a cooking process.

Preferentially, control unit 3 is also configured to interact with the user via voice communication device 4 in order to gather information from the user regarding a cooking recipe to be used, a degree of cooking, amount of food to be cooked and/or a number of persons participating in the meal. Even more preferentially, control unit 3 is also configured to control cooking zones 2 in dependence of the gathered information. E.g. the amount of food to be cooked can influence also the needed energy and/or power, which needs to be fed to the respective cooking zones. This allows to optimize the control of cooking zones 2 by means of control unit 3.

Advantageously, control unit is also configured to select and/or suggest and/or prohibit certain cooking functions of cooking appliance 1 based on the selected user profile. E.g. control unit 3 could, in use, prohibit certain cooking functions, if the user is e.g. a child.

Advantageously, control unit 3 is configured to consider information such as a type and/or format of cookware and/or recipe parameters and/or a type and/or a source and/or a quantity of ingredients used and/or cooking times and/or cooking temperatures and/or cooking powers and/or a degree of cooking and/or an amount of food to be cooked and/or a number of persons participating in a meal and/or a specific cooking zone, during control of cooking zones 2.

Preferentially, control unit 3 is configured to receive recipe specification information of a specific cooking recipe from the user via voice communication device 4 and to control the one or more cooking zones 2 as a function of the recipe specification information. In particular, the recipe specification information may contain the quantity of the single ingredients used and/or the type and/or format of the ingredient (e.g. spaghetti instead of other types of pasta) and/or the state of the ingredient (e.g. frozen, fresh, etc.).

Even more preferably, control unit 3 is configured to adjust and/or provide and/or suggest specific cooking settings and/or cooking parameters of the one or more cooking zones in dependence of the recipe specification information.

Furthermore, control unit 3 is configured to assign recipe-specific cooking settings and/or cooking parameters to said recipe information.

Advantageously, control unit 3 is configured to provide information to the user, in particular after receiving information from the user, via voice communication device 4 regarding at least a preferred cooking zone, cooking time, a type and/or source of ingredients and/or an amount of ingredients in dependence of the user profile and the respective cooking settings and/or the respective cooking parameters and/or the respective cooking recipes and/or the respective cooking programs associated to the user profile.

Advantageously, control unit 3 is configured to execute a set-up scheme the first time a user is recognized by control unit 3 and/or voice communication device 4 and to store a new user profile with respect to this new user. In particular, the set-up scheme requires the interaction with the new user via voice communication device 4. In addition, the user may also interact with control unit 3 by means of a user control interface 6.

Preferentially, control unit 3 is configured to run a question-answer scheme when, in use, running the set-up scheme, in particular for receiving specific information from the user, such as e.g. the name and/or the nickname and/or the user's sex and/or the user's age and/or birthday and/or the user's specific dietary preferences and/or information about the user's health status.

In use, cooking appliance 1 allows for the preparation of food products. In order to improve the user experience, cooking appliance 1 is operated such that voice communication device 4 receives an user input and control unit 3 and/or communication device 4 allow to identify and/or recognize the user based on the voice of the user resulting from the user input as received and/or acquired by voice communication device 4. Then, control unit 3 associates a user profile and the respective cooking settings and/or the respective cooking parameters and/or the respective cooking recipes and/or the respective cooking programs to the voice and/or user and to control cooking zones 2 as a function of the user profile and the respective cooking settings and/or the respective cooking parameters and/or the respective cooking recipes and/or the respective cooking programs.

It should be noted that the description and drawings merely illustrate the principles of the proposed invention. Those skilled in the art will be able to implement various arrangements that, although not explicitly described or shown herein, embody the principles of the invention.

LIST OF REFERENCE NUMERALS

1 cooking appliance
2 cooking zone
3 control unit
4 voice communication device
5 storage
6 graphical user control interface

The invention claimed is:

1. Cooking appliance for the preparation of a food product comprising:

one or more cooking zones;

a control unit for controlling the one or more cooking zones;

a storage unit configured to store one or more user profiles, and to store cooking settings, cooking parameters, cooking recipes and/or cooking programs associated to each said user profile;

a measurement unit operatively coupled to the control unit and configured to determine electrical values of the cooking appliance for establishing cookware-specific information of the cookware coupled to the one or more cooking zones; and a voice communication device operatively coupled with the control unit and configured to provide a communication interface to a user of the cooking appliance;

wherein the control unit and/or the voice communication device is/are configured to identify the user based on a voice of the user as received, in use, by the voice communication device;

wherein the control unit is configured to associate a selected user profile of said one or more user profiles and its respective cooking settings, cooking parameters, cooking recipes and/or cooking programs as stored in the storage unit to the user;

wherein the control unit is configured to control the one or more cooking zones as a function of the selected user profile and its respective cooking settings, cooking parameters, cooking recipes and/or cooking programs;

wherein, during execution of a cooking process and/or a cooking program, the cooking appliance is configured to allow the user to adjust the cooking parameters associated to the one or more cooking zones by means of a distinct control interface of the cooking appliance and/or the voice communication device, and the control unit is configured to update the respective cooking settings, cooking parameters, cooking recipes and/or cooking programs stored in the storage unit in dependence of the adjustments of the cooking parameters during execution of the cooking process and/or the cooking program; and wherein the control unit is configured to command the storage unit to store the cookware-specific information in the storage unit and to associate the cookware-specific information to the selected user profile associated to the user.

2. Cooking appliance according to claim 1, further comprising a power unit operatively coupled to the control unit and to the one or more cooking zones and configured to selectively power and/or energize the one or more cooking zones;

wherein the control unit is configured to control the power unit as a function of the selected user profile and its respective cooking settings, cooking parameters, cooking recipes and/or cooking programs for controlling the one or more cooking zones.

3. Cooking appliance according to claim 2, wherein the control unit is configured to control the power unit such that the power unit selectively powers, in use, the one or more cooking zones as a function of the selected user profile and its respective cooking settings, cooking parameters, cooking recipes and/or cooking programs.

4. Cooking appliance according to claim 1, wherein the control unit is configured to modify and/or delete the respective cooking settings, cooking parameters, cooking recipes and/or cooking programs associated to each of said one or more user profiles and/or to add new cooking settings, cooking parameters, cooking recipes and/or cooking programs to each of said one or more user profiles.

5. Cooking appliance according to claim 1, wherein the control unit is furthermore configured to communicate with the user via said voice communication device during use of the cooking appliance and to actively ask for a user input and/or a user action via said voice communication device.

6. Cooking appliance according to claim 5, wherein the control unit is also configured to adapt the respective cooking settings, cooking parameters, cooking recipes and/or cooking program associated to the selected user profile as stored in said storage unit based on said user input.

7. Cooking appliance according to claim 5, wherein the control unit is configured to instruct the user via the voice communication device to add ingredients and/or to perform specific cooking tasks during execution of the cooking program and/or the cooking process.

8. Cooking appliance according to claim 1, wherein the control unit is configured to select and/or suggest and/or prohibit certain cooking functions of the cooking appliance based on the selected user profile.

9. Cooking appliance according to claim 1, wherein the respective cooking settings, cooking parameters, cooking recipes and/or cooking programs associated to each of said one or more user profiles contain information regarding at least one of the following: a type and/or format of cookware, recipe parameters, a type and/or a source and/or a quantity of ingredients, cooking times, cooking temperatures, cooking powers, degree of cooking, an amount of food to be cooked, a number of persons participating in a meal.

10. Cooking appliance according to claim 1, wherein the control unit is configured to receive recipe specification information of a specific cooking recipe from the user via the voice communication device and to control the one or more cooking zones as a function of the recipe specification information.

11. Cooking appliance according to claim 10, wherein the control unit is configured to adjust, provide and/or suggest specific cooking settings and/or cooking parameters of the one or more cooking zones in dependence of the recipe specification information.

12. Cooking appliance according to claim 1, wherein the control unit is configured to interact with the user via the voice communication device in order to gather information from the user regarding a cooking recipe to be used, a degree of cooking, amount of food to be cooked and/or number of persons participating in a meal.

13. Cooking appliance according to claim 1, wherein the control unit is configured to provide information to the user after receiving information from the user, via the voice communication device regarding at least a preferred one of said one or more cooking zones, cooking time, amount of food, a type and/or source of ingredients and/or an amount of ingredients in dependence of the selected user profile and its respective cooking settings, cooking parameters, cooking recipes and/or cooking programs.

14. Cooking appliance according to claim 1, wherein the measurement unit is configured to determine cooking parameters before, during and/or after execution of the cooking program and/or the cooking process.

15. Cooking appliance according to claim 14, wherein the measurement unit comprises one or more sensors configured to determine one or more physical parameters of the food product, the cookware containing the food product and/or the one or more cooking zones.

16. Cooking appliance according to claim 14, wherein the control unit is configured to choose and/or control cooking settings based on the cooking parameters and/or the cookware-specific information determined by the measurement unit.

17. Cooking appliance according to claim 1, wherein the control unit is configured to execute a set-up scheme a first time a new user is recognized by the control unit and/or the voice communication device and to store a new user profile with respect to this new user in the storage unit.

18. Cooking appliance according to claim 1, wherein the control unit is configured to prohibit certain cooking functions of the cooking appliance based on the selected user profile.

19. Method for controlling a cooking process of a cooking appliance for the preparation of a food product; the cooking appliance comprising:

one or more cooking zones;

a measurement unit configured to determine electrical values of the cooking appliance for establishing cookware-specific information of the cookware coupled to the cooking zone, a control unit for controlling the one or more cooking zones;

a storage unit configured to store one or more user profiles, and to store cooking settings, cooking parameters, cooking recipes, and/or cooking programs associated to each said user profile; and a voice communication device operatively coupled with the control unit and configured to provide a communication interface to a user of the cooking appliance;

wherein the method comprises:

receiving a user input via the voice communication device;

identifying the user based on the user's voice resulting from the user input as received by the voice communication device;

associating a selected user profile of said one or more user profiles and its respective cooking settings, cooking parameters, cooking recipes and/or cooking programs as stored in the storage unit to the user;

performing the cooking process by controlling the one or more cooking zones as a function of the selected user profile and its respective cooking settings, cooking parameters, cooking recipes and/or cooking programs;

during execution of the cooking process, executing adjustments of cooking parameters associated to the one or more cooking zones by means of a distinct control interface of the cooking appliance and/or the voice communication device, and updating the respective cooking settings, cooking parameters, and/or cooking recipes in dependence of the adjustments of cooking parameters during execution of the cooking process; and commanding the storage unit to store the cookware-specific information in the storage unit and to associate the cookware-specific information to the selected user profile associated to the user.

20. A cooking appliance comprising a cooking zone, a measurement unit configured to determine electrical values of the cooking appliance for establishing cookware-specific information of the cookware coupled to the cooking zone, and a controller operatively coupled to the cooking zone and measurement unit and configured to control the cooking zone for cooking a food product, the controller being operatively coupled via wired or wireless communication to each of a voice communication device and a storage unit, wherein the controller is configured to:

receive a first voice input from a known user via the voice communication device, and associate that known user with a selected user profile among a plurality of user profiles stored in the storage unit based on a first voice characteristic of the known user that is stored as part of the selected user profile, each of the plurality of user profiles comprising respective cooking settings and/or cooking recipes that have been prior associated with respective known users;

control the cooking zone during a cooking operation based on the cooking settings and/or cooking recipes of the selected user profile;

during the cooking operation, allow the known user to execute adjustments of the cooking parameters associated to the cooking zone by means of a distinct control interface of the cooking appliance and/or the voice communication device, and modify the cooking settings and/or cooking recipes of the selected user profile in dependence of the adjustments of the cooking parameters made by the known user during the cooking operation, so that the modified cooking settings and/or modified cooking recipes become part of the selected user profile stored in the storage unit for subsequent cooking operations executed by the controller;

suggest and/or prohibit selected cooking functions of the cooking appliance based on the selected user profile;

prompt interactions during the cooking operation for tasks that the cooking appliance cannot alone accomplish without such interactions;

command the storage unit to store the cookware-specific information in the storage unit and to associate the cookware-specific information to the selected user profile associated to the user; and execute a set-up scheme for a new user of the cooking appliance, comprising receiving a second voice input from the new user via the voice communication device, and associate a second voice characteristic of the new user to a new user profile that is added to the storage unit to thereby become another of the plurality of user profiles stored therein, wherein the new user thereby becomes one of said known users.

21. The cooking appliance of claim 20, further comprising a sensor operatively coupled to the controller and adapted to supply thereto real-time data concerning the cooking operation and/or cookware-specific information for cookware used in the cooking operation, said controller being further configured to:

adjust its control of the cooking zone during said cooking operation based on said real-time data; and provide information and/or instructions to the known user via the voice communication device concerning the cooking operation.

* * * * *